T. J. COOKSON.
FLOAT.
APPLICATION FILED FEB. 20, 1911.
998,279.
Patented July 18, 1911.
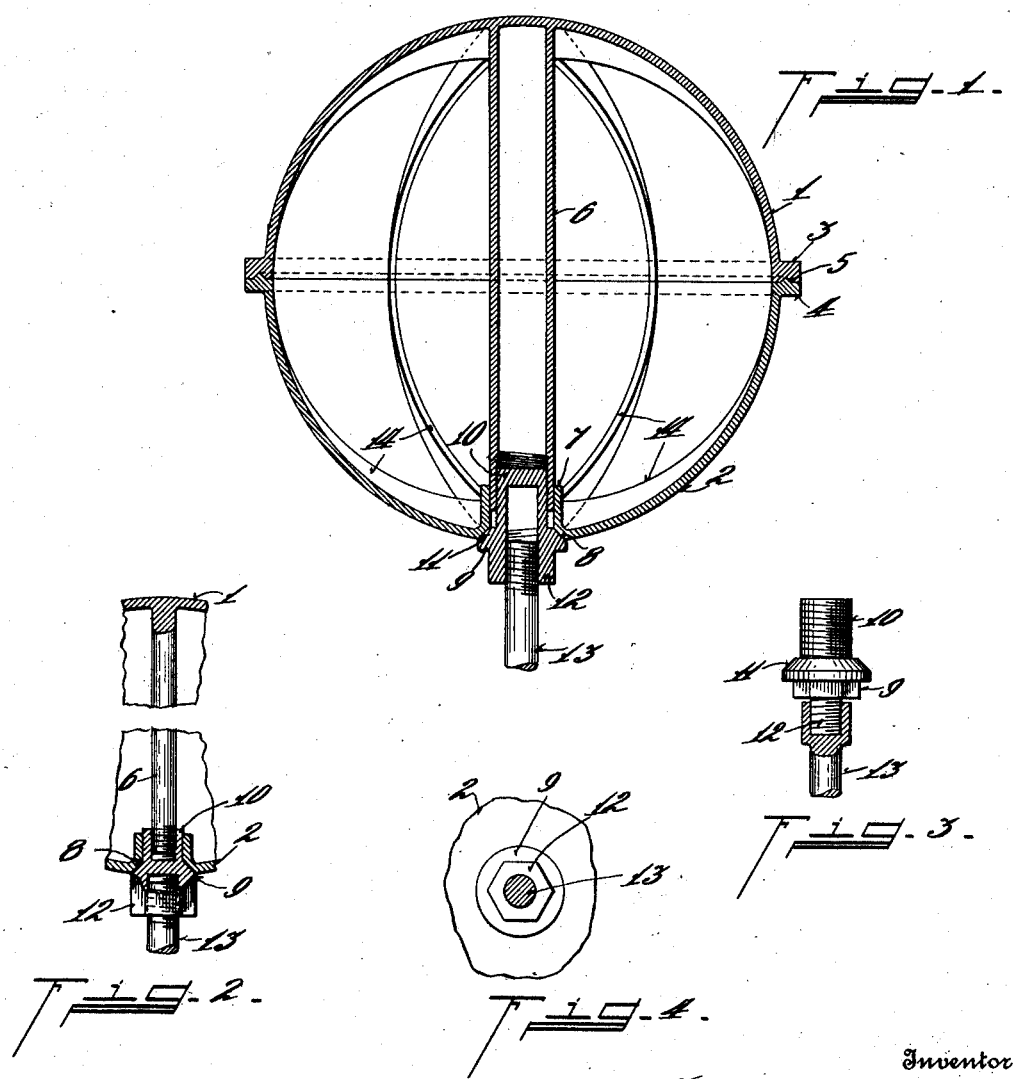

UNITED STATES PATENT OFFICE.

THOMAS J. COOKSON, OF CINCINNATI, OHIO.

FLOAT.

998,279.     Specification of Letters Patent.     Patented July 18, 1911.

Application filed February 20, 1911. Serial No. 609,732.

*To all whom it may concern:*

Be it known that I, THOMAS J. COOKSON, a citizen of the United States, residing at Cincinnati, in the county of Hamilton and State of Ohio, have invented certain new and useful Improvements in Floats, of which the following is a specification.

My invention relates to an improved float utilized as an actuating agency in various types of fluid handling apparatus.

One of the objects of the invention is to produce a simple and cheap float.

Another object of the invention is to provide a float which can be readily formed of cast metal.

Another object of the invention is to produce a float sufficiently strong to withstand maximum external pressure.

Another object of the invention is to provide a cast float comprising hemispherical sections reinforced at the poles and the equator, which can be readily separated or put together and secured by efficient clamping means forming substantially a water-tight seal.

Another object of the invention is to provide a clamping agency applied to one or both of the poles and containing the sockets comprising either a male or female member for securing the float to its supporting element and interchangeable so that a given float can be applied to any desired steam or water apparatus.

The features of the invention are more fully set forth in the description of the accompanying drawings, forming a part of this specification, in which:—

Figure 1 is a central vertical section through the float. Fig. 2 is a sectional view of a portion of the float taken along the diametrical pole structure of a modification. Fig. 3 is a detail view, partly in section, of a different form of clamping socket from that shown in Fig. 1. Fig. 4 is a bottom plan view of the clamping socket.

The float is composed of the two hemispheres 1, 2, to be secured together, the upper hemisphere 1 is provided with the equatorial laterally extended flange 3. The lower hemisphere 2 has a similar flange 4. The meeting faces of these flanges are provided with the interlocking surfaces 5, forming an effectual water seal joint. These hemispheres may be cast in suitable molds, preferably, from composition metal containing aluminum as an ingredient, the walls being of uniform thickness, say approximately one sixteenth of an inch. The upper hemisphere 1 is preferably formed with the diametrical or axial strut 6, the lower end of which enters the sleeve 7, formed at the pole of the lower hemisphere 2. This strut may be either solid or hollow, as respectively shown in Figs. 2 and 1, the lower end being appropriately externally or internally screw threaded. Preferably, also, the exterior annular surface of the sleeve 7 is beveled to form the socket seat 8.

9 represents the clamping socket, the upper end 10 of which extends into the sleeve 7, and is provided with either external or internal screw threads for appropriately engaging the screw threads of the strut 6. The clamping socket is also preferably formed with the annular beveled flange 11, for engaging the seat 8, so as to improve the clamping efficiency as well as the seal of the joint. The lower end 12 of the clamping socket is also screw threaded, either interiorly or exteriorly, depending upon the structure of the element to which the float is to be attached and which is represented in the drawing by the rod 13. These sockets being interchangeable permit of the use of either external or internal screw threads at the upper end for engaging the pole of the strut, or of external or internal screw threaded lower end for securing the float to the element upon which it is to be supported, and also, these sockets being interchangeable permit the use of different sizes to meet the conditions presented by the structure and size of the apparatus with which the float is to be associated. Thus, a given float may be regarded as universal in its capacity for adaptation to the varying conditions of application.

While it is not essential, I preferably employ the spherical reinforcing means illustrated in the drawings, comprising meridional-like ribs 14, formed on the inner surfaces of the respective hemispheres. As shown in the drawings, the ribs extend in planes transversely to the sphere, preferably tapering toward the equatorial zone. Thus, it will be seen, that when the hemispheres are united they are reinforced at the poles both by the character of this rib construction, the diametrical strut and the socket, while the sphere is sufficiently reinforced at the equatorial line by the character of the joint flanges 3, 4. The hemispheres may be very forcibly clamped together by the socket 9, the construction withstanding the clamping pressure, as well as the external pressure incident to usage, thus forming a practically integral sphere which retains its rotundity under all conditions.

The cheapness, strength, efficiency and convenience of this float will be readily understood from this description.

The geographical terms are used for convenience of identification, it being understood that the float may be oblong or of various contours.

Having described my invention, I claim:—

1. A float formed of hollow spherical sections having interlocking surfaces at their meeting edges, one of said sections being formed with an axial strut and the other with a central orifice into which said strut enters, and a member having one end formed with screw threads for engaging the end of the strut to clamp the sections together, and the other end being formed with means for attachment to the element on which the float is to be supported.

2. A float formed of hollow spherical sections formed with a reinforced structure having interlocking surfaces at their meeting edges, one of said sections being provided with an axial strut and the other section being formed with a central orifice into which said strut enters, and a clamping socket engaging the strut for clamping the sections together and providing a means for attaching the float to its support.

3. A float comprising hollow spherical sections, and a removable member for clamping said sections together and attaching the float to its support.

4. A float comprising hollow spherical sections, an interchangeable member for clamping said sections together and attaching the float to its support, and reinforcing means disposed at the poles and the equatorial zone.

5. A float composed of hollow spherical sections, having interlocking reinforced structures at their meeting edges, one of said sections being formed with an axial strut, the other section being formed with a polar sleeve into which said strut enters, and a clamping socket seating on the polar sleeve, having screw threaded engagement with the strut, its exterior end being formed to engage the element to which the float is to be attached.

6. A float formed of hollow spherical sections, having interlocking reinforced structures at their meeting edges, an axial strut, a member having a screw threaded engagement with the strut at the pole of one of its sections, the exterior end being formed to engage the float support and meridional-like ribs formed on said sections.

7. A float composed of hollow hemispherical sections formed to joint at their meeting edges, an axial strut attached to the pole of one of the hemispheres, and means for clamping the other end of the strut relative to the pole of the adjacent hemisphere, the exterior of said means being formed to engage with the float supporting element.

8. In combination with hollow spherical sections, jointed at their meeting edges, and means for forcibly clamping them together in their axial line, said means being formed with provision for attaching the float to its support.

In testimony whereof, I have hereunto set my hand.

THOMAS J. COOKSON.

Witnesses:
 OLIVER B. KAISER,
 CLARENCE B. FOSTER.

Copies of this patent may be obtained for five cents each, by addressing the "Commissioner of Patents, Washington, D. C."